Figure 1:
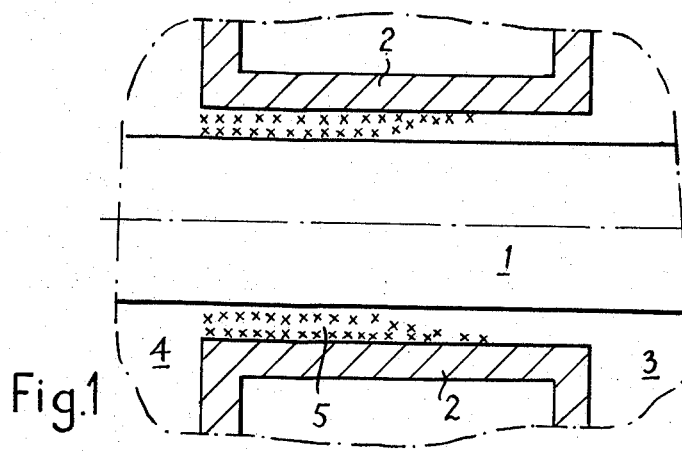

United States Patent

[11] 3,630,582

| [72] | Inventors | Jacques Maire<br>Epinay/Seine;<br>Robert Gremion, Saint-Leu-La-Foret; Jean Lemaire, Saint-Denis, all of France |
|---|---|---|
| [21] | Appl. No. | 16,003 |
| [22] | Filed | Mar. 3, 1970 |
| [45] | Patented | Dec. 28, 1971 |
| [73] | Assignee | Le Carbone-Lorraine<br>Paris, France |
| [32] | Priority | Mar. 10, 1969 |
| [33] | | France |
| [31] | | 6906583 |

[54] SEALING JOINTS
7 Claims, 4 Drawing Figs.

[52] U.S. Cl. .................................................. 308/36.3,
308/77, 277/16, 277/22
[51] Int. Cl. ........................................................ F16c 33/78,
F16j 15/40
[50] Field of Search .......................................... 277/135,
16, 22; 308/77, 36.3, 36.1

[56] References Cited
UNITED STATES PATENTS

| 2,799,522 | 7/1957 | King et al. ..................... | 277/22 X |
| 3,129,947 | 4/1964 | Streck ........................... | 277/22 |
| 3,333,907 | 8/1967 | Lamb ............................ | 308/77 |
| 3,091,469 | 5/1963 | Matt.............................. | 277/22 X |
| 3,117,792 | 1/1964 | Glenn et al. ................... | 277/22 X |

*Primary Examiner*—Martin P. Schwadron
*Assistant Examiner*—Barry Grossman
*Attorney*—Holcombe, Wetherill & Brisebois ABSTRACT: This invention relates to sealing joints, for example, for preventing leakage of a fluid from one part of a machine to another via relatively rotating members such as a shaft and a bearing therefor. According to the invention, the sealing joint comprises a barrier means that is formed from the fluid itself, from one of its components and from a body in contact with the fluid to be sealed. The barrier means advantageously comprises the condensate of a condensable body and this body may either be contained within the fluid to be sealed or it may be introduced between the said fluid and an exterior fluid. The formation of the condensate can be effected by cooling appropriate parts of the system.

SEALING JOINTS

The present invention relates to sealing joints for use in the presence of a fluid, more particularly in the presence of a vapor or gas.

Joints and seals of various kinds are known, for example, those incorporating packing or stuffing, those employing labyrinth or floating socket, and yet others which include a bath of centrifuged liquid.

The present invention has for an object an effective sealing joint that shall be operative in the presence of a fluid. According to the invention, the seal is ensured by a solid or liquid barrier means, formed from the fluid phase itself which it is desired to prevent leaking, from one of its components, and from a body that is either contained within the fluid to be sealed, or is introduced between the said fluid and an external fluid.

In practising the invention, there is induced in a space to be sealed, the formation of a solid or liquid phase by suitably cooling a predetermined area of a system with which the sealing joint is used, and by bringing into action a change of state such as the passage from the gaseous state to the solid state, directly or by passing through the liquid phase, the passage from the gaseous state to the liquid state or even the separation of a solid phase from a liquid phase.

Figure 2:
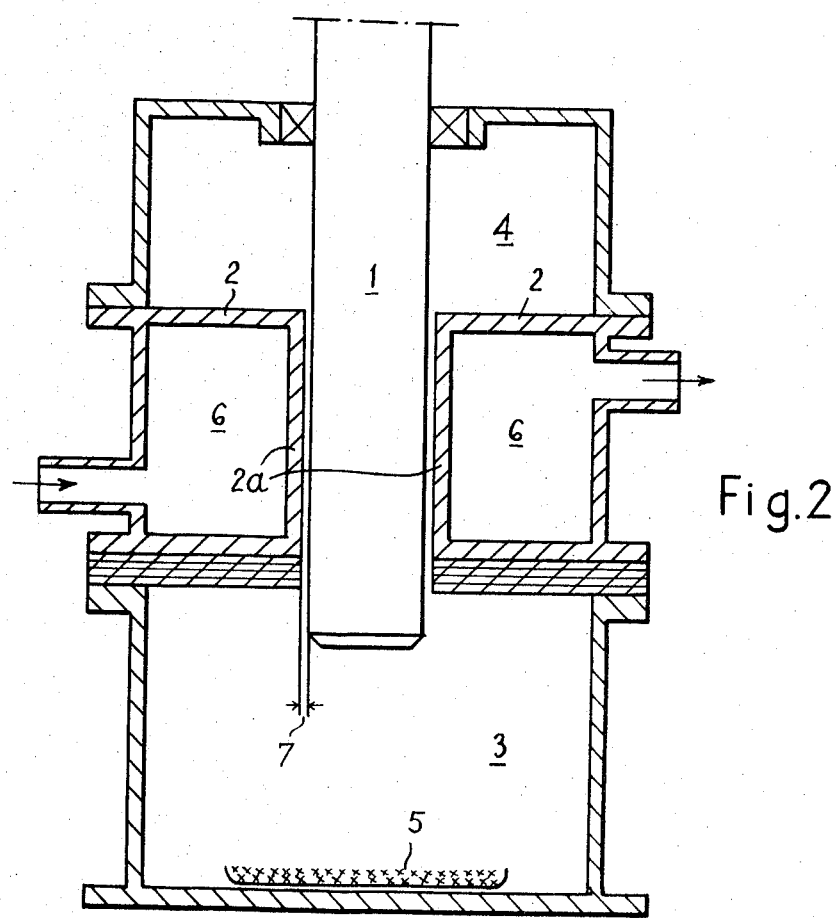
Figure 3:
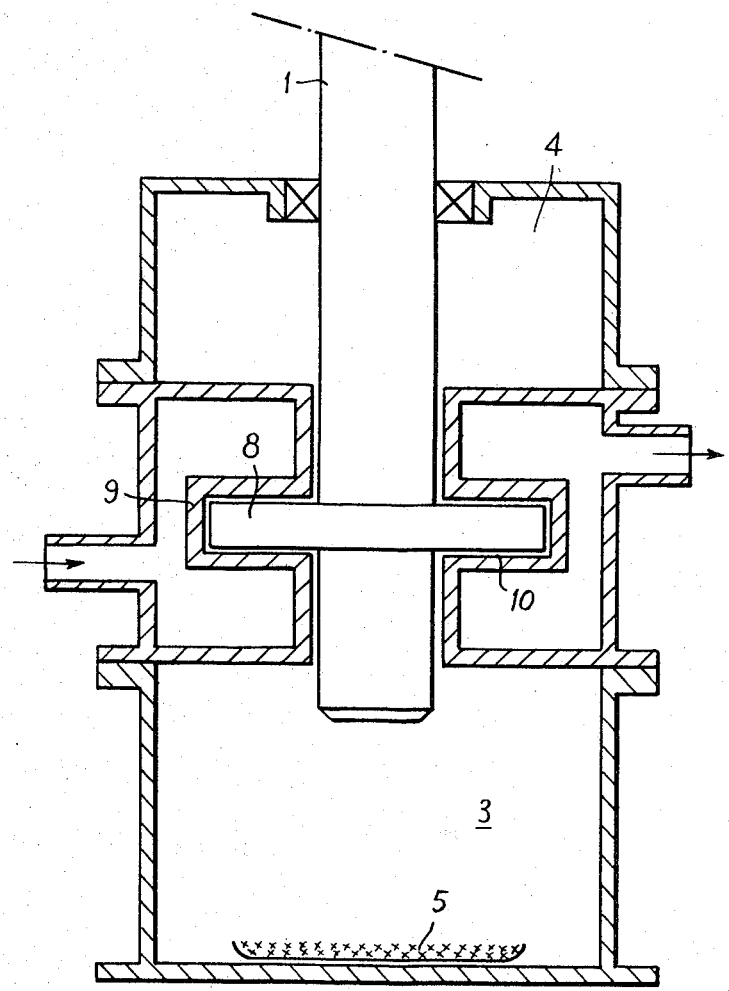
Figure 4:
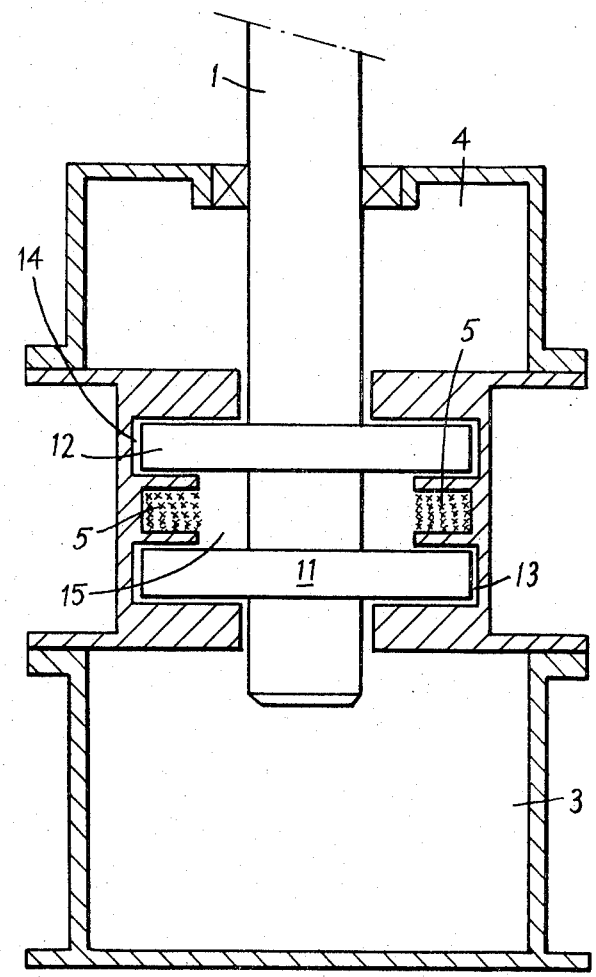

In order that the invention shall be more clearly understood, reference will now be made to the accompanying drawings, schematically showing certain embodiments thereof by way of example, and in which:

FIG. 1 illustrates the principles of the invention applied to the sealing of a smooth shaft rotatable in a stationary bearing member, FIG. 2 shows a practical embodiment of the principle illustrated in FIG. 1, FIG. 3 shows another embodiment using a labyrinthine seal, and FIG. 4 shows a third embodiment using a labyrinthine seal of different characteristics from that shown in FIG. 3.

Referring now to the drawings, the principle of the invention is illustrated in FIG. 1, where the system being sealed from a fluid comprises, for example, a shaft 1 rotating in a stationary bearing or socket 2 with a certain amount of play therebetween, the bearing or socket separating a chamber 3 containing a fluid to be sealed from a chamber 4, this latter, for example, being representative of the ambient atmosphere. The reduction of the play to an insignificant degree is obtained by condensation from a body 5 which is located, for example, in the chamber 3.

In accordance with the invention, this condensation is achieved by cooling the wall of the bearing or socket to a temperature lower than the temperature of the saturating vapor corresponding to the pressure of a condensable body contained in the chamber 3. To this end, the wall of the bearing or socket is cooled from the side of the chamber 4 and the condensable body, represented at 5, is deposited progressively in condensate form until it is in contact with the shaft 1.

In order to treat the problem in its entirety, it should be pointed out that the lowering of the temperature must be such that the body has a negligible vapor pressure with respect to the pressure prevailing in the chamber 4, which, as referred to above, may, for example, be the atmosphere.

The degree of cooling of the wall of the bearing or socket must be such that either there is a very fine gaseous film between the shaft and the condensed phase, or the condensed phase must completely fill the gap between the bearing or socket and the shaft, thus giving rise to friction.

It is noted, however, that even in the case where a very fine gaseous film exists, "instantaneous" friction takes place due to the fact that there are machines, represented by the shaft and its bearing, which are not geometrically perfect. There is, therefore, in fact a succession of contacts which are instantaneously destroyed by vaporization.

It is observed that the sealing barrier means is formed and completed automatically and that, more particularly, any deterioration of the barrier wall formed by the condensed material corrects itself by re-condensation in any holes or scratches which have possible been formed.

The following examples, given by way of nonlimiting indication, will allow the invention to be better understood.

EXAMPLE 1

This example shows an arrangement wherein the fluid to be sealed is nitrogen and the condensable body is camphor.

The arrangement shown in FIG. 2 comprises a smooth rotating shaft 1, a stationary cylindrical bearing or socket 2, and a chamber 3 filled with nitrogen containing some camphor at 5. The bearing or socket has s cylindrical wall 2a that is enclosed by a chamber 6 in which cooling water is caused to circulate by any known or desired means, not per se forming part of the present invention.

The data are as follows: the nitrogen in the chamber 3 is at a pressure of 760 mm. of mercury; the air in chamber 4 is at a variable pressure between 760 and 300 mm. of mercury; the temperature of the cooling water is 10° C; the play, shown as a gap 7 in the drawing, has a radial dimension of 0.5 mm. the out-of-round parameter of the shaft $1 \le 0.02$ mm. The assembly is placed in an enclosure at 60° C. The vapor pressure of camphor at 60° C. is known to be 4 mm. of mercury, and at 10° C. <0.5 mm. of mercury.

For a pressure difference of 360 mm. of mercury between the chambers 3 and 4, an escape of $10^{-5}$ g./s. has been laid down.

A similar effect can be obtained not only with a bearing or socket and a smooth shaft, but also with an assembly incorporating a labyrinth such as described below in connection with examples 2 and 3.

EXAMPLE 2

The fluids and the condensable body are the same as those referred to in example 1.

The arrangement shown in FIG. 3 comprises a disc 8 secured to or forming part of the shaft 1 and projecting perpendicularly to its axis, said disc rotating in a cavity 9 whose walls are parallel thereto. The play, represented by the gap 10, is similar to that referred to in the preceding example. This disc separates the chamber 3, in which the nitrogen and camphor are contained, from the chamber 4.

By cooling the walls of the cavity 9, some of the camphor is condensed on each side of the disc. This condensate carries out the sealing action as heretofore.

EXAMPLE 3

The fluids and the condensable body are the same as those of the preceding examples, but in this case the condensable body is introduced between the fluid to be sealed and the outer fluid, instead of being contained within the fluid to be sealed.

The arrangement shown in FIG. 4 comprises two discs 11 and 12 secured to the shaft 1 and perpendicular to its axis, rotating respectively in cavities 13 and 14, the walls of which are parallel to the discs. These discs separate the chamber 3, in which only nitrogen is present, from the chamber 4.

The camphor 5 is introduced into an intermediate chamber 15 between the two discs.

By cooling the walls of the cavities 13 and 14, a part of the camphor is condensed on each side of the discs. These condensates again bring about the sealing action.

This arrangement has the advantage over those described in the preceding examples, of not introducing impurities into the fluid to be sealed.

We claim:

1. In combination, a bearing member having walls, a rotary shaft received by said bearing member, and a sealing joint for sealing off a fluid, means being provided to cool said walls of said bearing member, said joint comprising barrier means formed from at least one of the constituents of said fluid, and at least one disc mounted on said shaft perpendicular to the axis thereof to form a labyrinth in conjunction with said bearing member walls.

2. A joint according to claim 1, wherein said barrier means is a condensate of a condensable body contained within said fluid.

3. A joint according to claim 1, wherein said barrier means is a condensate of a condensable body introduced between said fluid and an exterior fluid.

4. A joint according to claim 2, wherein said barrier means is present adjacent said disc.

5. A joint according to claim 1, wherein two discs are mounted on said shaft each perpendicular to the axis thereof to define a chamber and to form a labyrinth with said bearing member walls, said barrier means being present adjacent said discs and consisting of the condensate of a condensable body introduced into said chamber.

6. A joint according to claim 2, wherein said fluid is gaseous nitrogen and said condensable body is camphor.

7. A joint according to claim 3, wherein said fluid is gaseous nitrogen and said condensable body is camphor.

* * * * *